(12) United States Patent
Grottel et al.

(10) Patent No.: US 7,673,081 B2
(45) Date of Patent: Mar. 2, 2010

(54) METHOD FOR DATA AND SIGNAL TRANSFER BETWEEN DIFFERENT SUB-UNITS OF A MEDICALLY-RELATED SYSTEM

(75) Inventors: Joachim Grottel, Lauf (DE); Klaus Gruber, Ansbach (DE); Stefan Popescu, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 443 days.

(21) Appl. No.: 10/992,859

(22) Filed: Nov. 19, 2004

(65) Prior Publication Data

US 2005/0169263 A1   Aug. 4, 2005

(30) Foreign Application Priority Data

Nov. 21, 2003   (DE)   ................... 103 54 494

(51) Int. Cl.
  *G06F 13/38*   (2006.01)
  *G06F 3/00*   (2006.01)
  *H04J 14/08*   (2006.01)
  *H05G 1/60*   (2006.01)

(52) U.S. Cl. ................ 710/69; 710/30; 370/464; 378/21; 378/98; 378/193

(58) Field of Classification Search ............ 710/30, 710/69
    See application file for complete search history.

(56) References Cited

U.S. PATENT DOCUMENTS

| 4,764,939 | A | * | 8/1988 | Rogers ................ 375/259 |
| 4,974,181 | A | * | 11/1990 | Sinderson et al. .......... 702/182 |
| 5,025,458 | A | * | 6/1991 | Casper et al. ............ 375/365 |
| 5,272,627 | A | * | 12/1993 | Maschhoff et al. .......... 378/4 |
| 5,646,962 | A |   | 7/1997 | Harrison |
| 5,742,060 | A | * | 4/1998 | Ashburn ............ 250/370.09 |
| 6,145,024 | A | * | 11/2000 | Maezawa et al. ............ 710/14 |
| 6,292,919 | B1 | * | 9/2001 | Fries et al. ................ 714/758 |
| 6,470,071 | B1 | * | 10/2002 | Baertsch et al. ............ 378/62 |
| 6,708,239 | B1 | * | 3/2004 | Ellerbrock et al. .......... 710/62 |
| 2002/0003450 | A1 |   | 1/2002 | Pearson, Jr. et al. |
| 2002/0150045 | A1 |   | 10/2002 | Vogtmeier et al. |
| 2002/0172228 | A1 | * | 11/2002 | Popescu .................. 370/516 |
| 2003/0152393 | A1 |   | 8/2003 | Khoury |
| 2003/0214953 | A1 | * | 11/2003 | El-Demerdash et al. ..... 370/400 |
| 2004/0184574 | A1 | * | 9/2004 | Wu et al. ................... 378/5 |

OTHER PUBLICATIONS

Ethernet Technologies Cisco Systems Inc. Available: http://web.archive.org/web/20000815074958/http://www.cisco.com/univercd/cc/td/doc/cisintwk/ito_doc/ethernet.htm Aug. 2000 version.*
"Principles of Communication Systems," 2d ed., Taub et al (1986), pp. 682-719.

* cited by examiner

*Primary Examiner*—Henry W. H. Tsai
*Assistant Examiner*—Michael Sun
(74) *Attorney, Agent, or Firm*—Schiff Hardin LLP

(57) ABSTRACT

In a method and system for data and signal transfer between different sub-units of a medically-related system, in particular a CT system, digitized signals and digital data are transmitted together on a transmission line by means of serial multiplexing. The digitized signals and the digital data are transferred combined into individual packets having a length that is so small that the adherence to a predetermined updating rate of the signals is achieved. The expenditure for the wiring as well as for future expansions in medically-related systems can be significantly reduced.

23 Claims, 4 Drawing Sheets

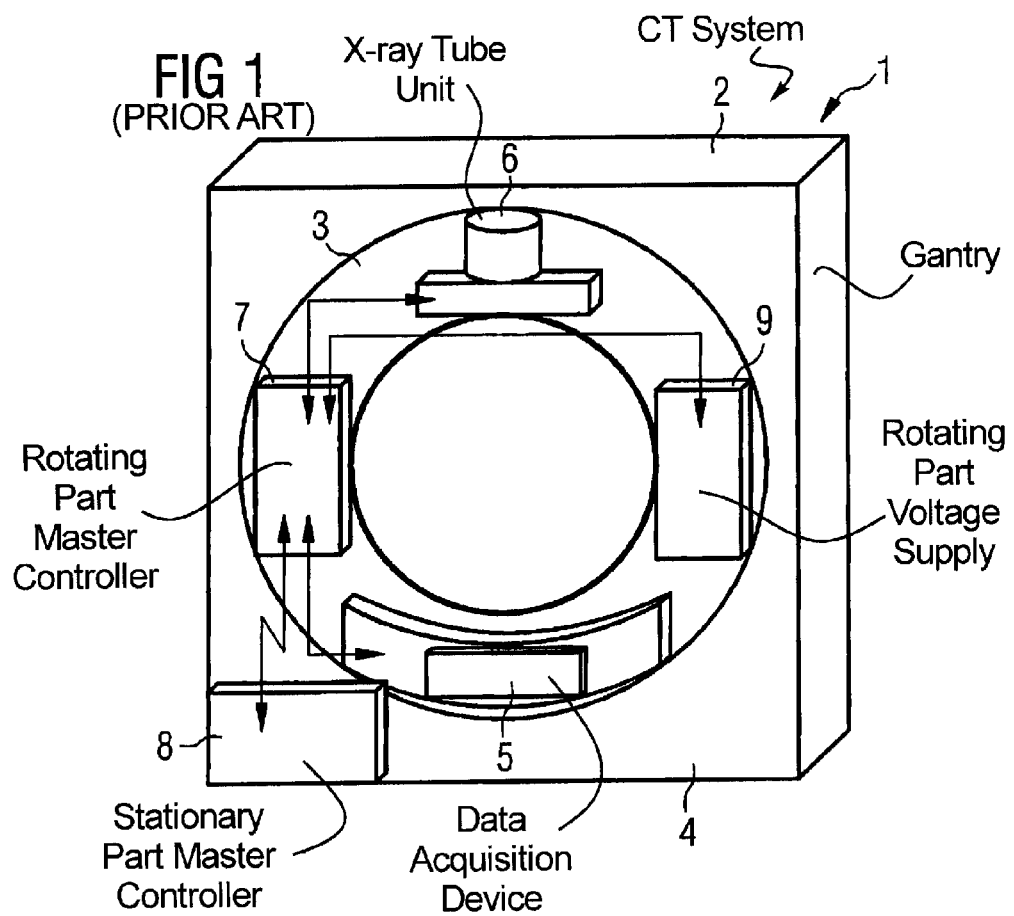
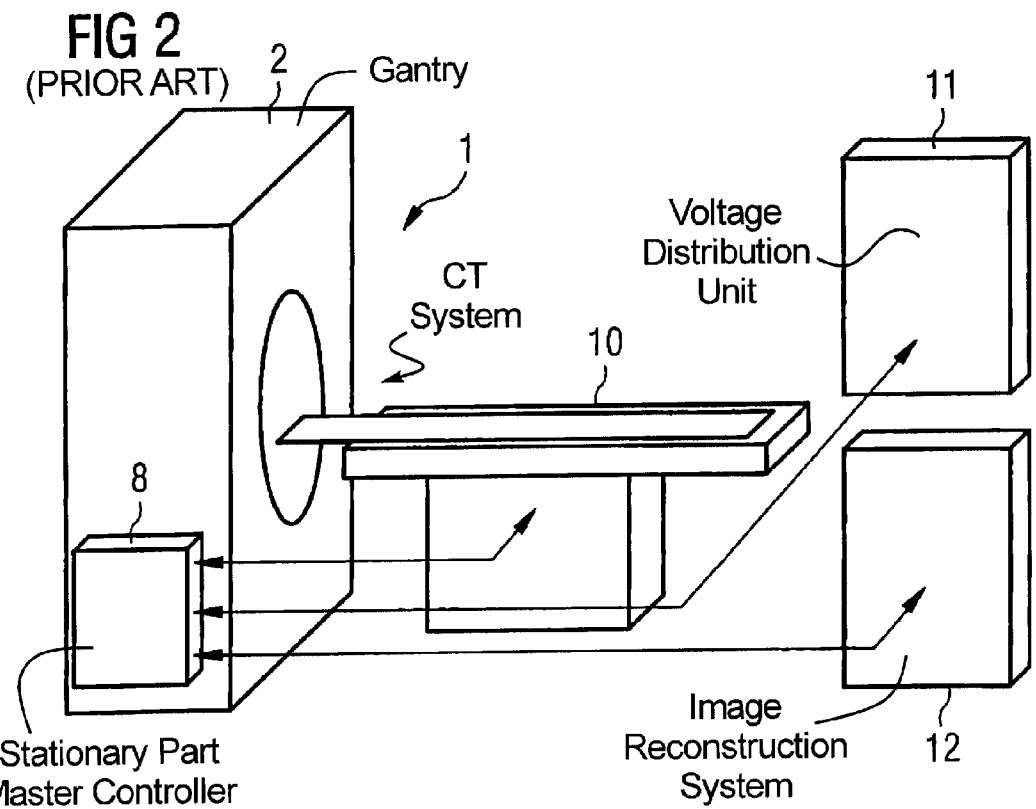

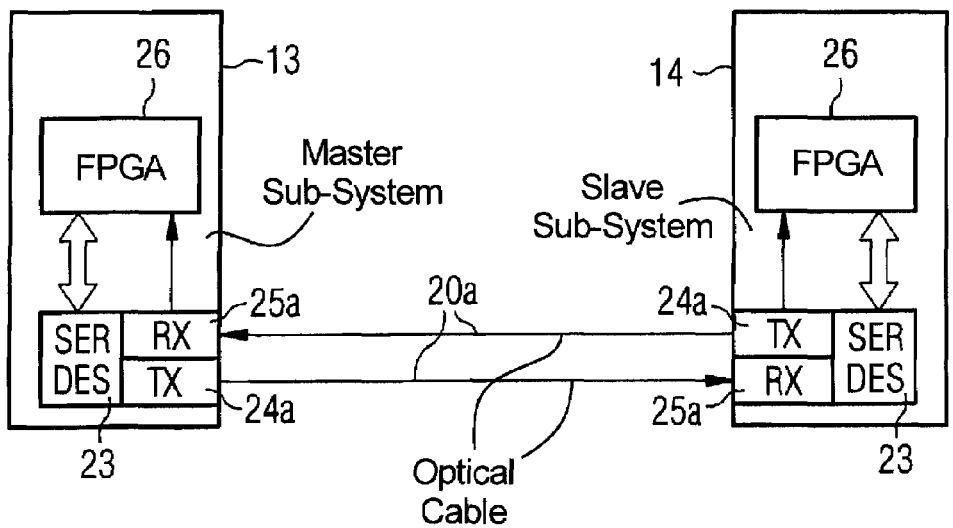
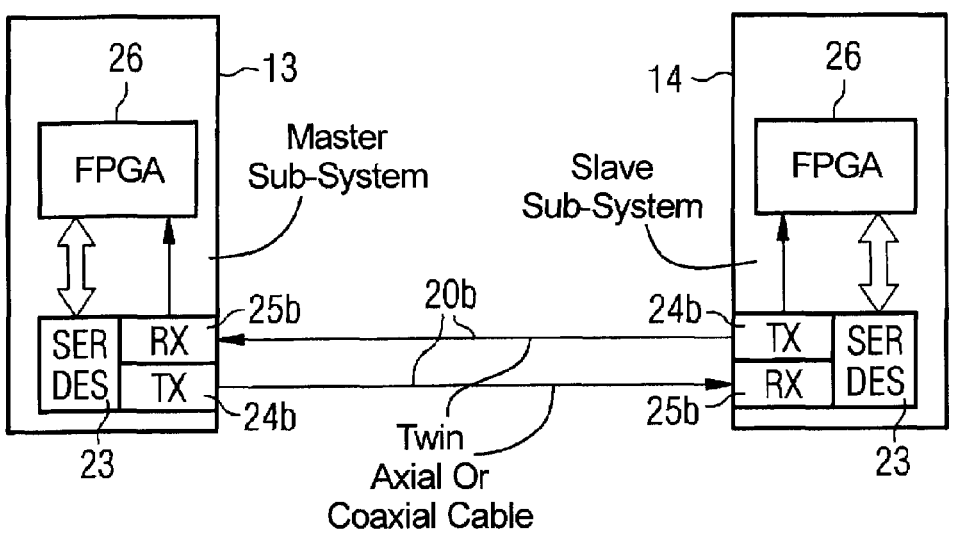
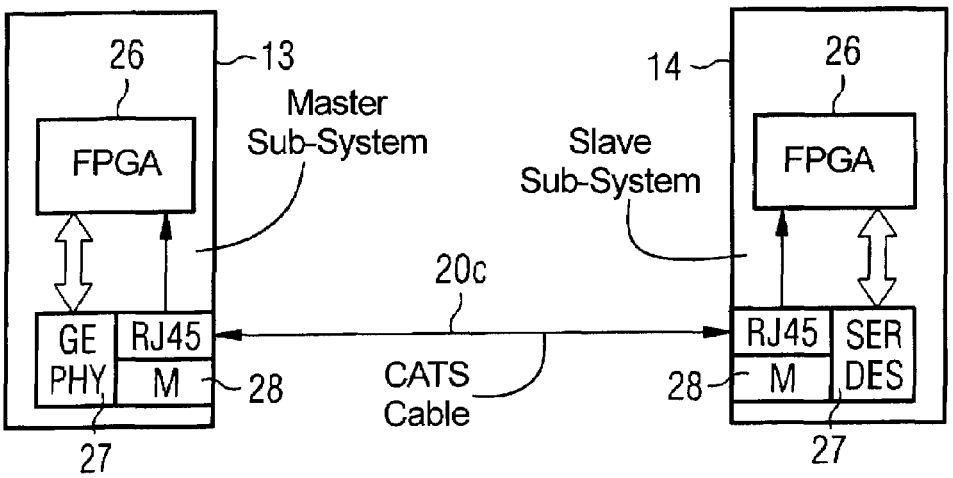

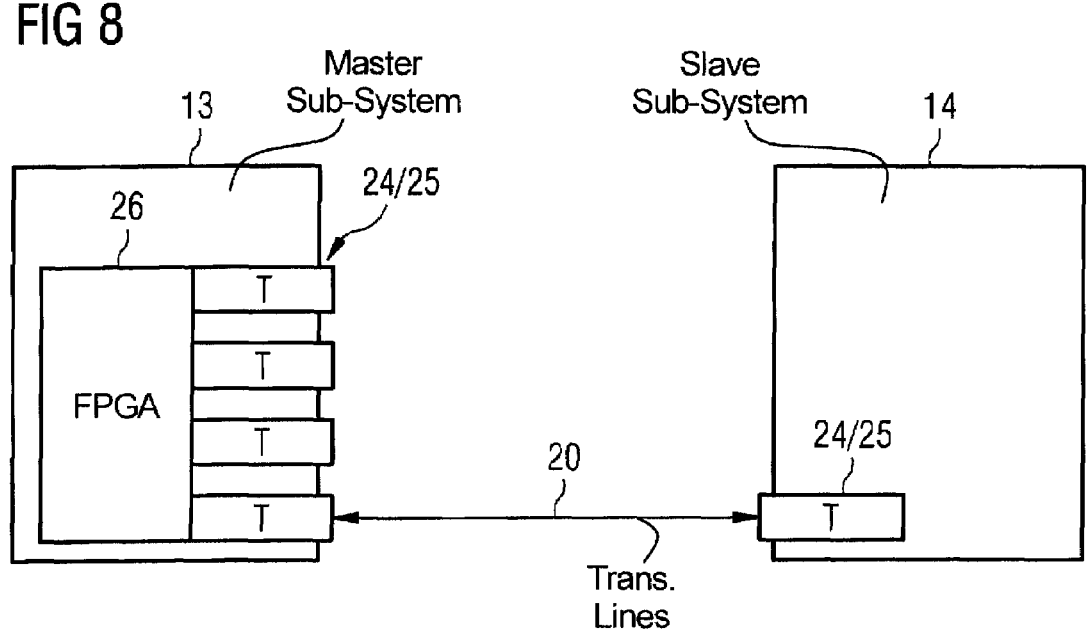

METHOD FOR DATA AND SIGNAL TRANSFER BETWEEN DIFFERENT SUB-UNITS OF A MEDICALLY-RELATED SYSTEM

BACKGROUND OF THE INVENTION

1. Field of the Invention

The present invention a method for data and signal transfer between different sub-units of a medically-related system, in particular a CT system, as well as a medically-related system in which the method is implemented.

2. Description of the Prior Art

Medically-related systems, in particular modern CT systems, include a number of connection lines between the individual sub-units, via which signals are transmitted for the activation of components of the system, as well as for the transfer of digital data such as, for example, measurement data. Due to the continuing development, CT systems require a flexible and expandable architecture that should be directed toward high reliability as well as toward a simple implementation of service tasks, and additionally should limit the cost expenditure for expansions.

Just like the other, medically-related systems, for example in the field of magnetic resonance tomography, the architecture of currently used CT systems is based on the use of a standard control network such as, for example, CAN (Controller Area Network) for the transfer of digital data with low speed. Furthermore, numerous additional connection lines are used via which (respectively based on a separate protocol and a separate specification) logic signals are transferred, usually in analog form. In particular signals that must be frequently and very quickly updated during the system operation (such as, for example, control signals) are transmitted via these latter connection lines. This leads to a multiplicity of connections with respectively different protocols that make future improvement and expansion of such a system more difficult.

U.S. patent application Pub. No. 2003/0214953 specifies a method for data and signal transfer between different sub-units of a medical system in which communication is effected between master nodes and slave nodes via a network. The master or slave nodes are associated with different sub-units of the medical system. This published application discloses the use of a uniform communication protocol for the data and signal transfer between the individual nodes. The CAN and the CAN OPEN network are proposed.

German OS 195 41 441 discloses an apparatus for transfer of data between the rotating part and the stationary part of a computed tomography apparatus. The apparatus has a carrier generator unit to generate first and second carrier signals with an adaptable phase shift angle between one another that corresponds to an externally acquired control signal, and a modulation device to receive an externally acquired data signal, for example image data, in order to generate first and second modulated output signals with a selectable phase angle difference. The phase angle difference is selected in order to prevent formation of leakage signals due to a misalignment between the coupler and the transmission line during the rotation movement.

The publication by H. Taub et al., "Principles of Communication Systems", 2nd edition, McGraw-Hill Publishing Company, 1986, pages 682-719 gives a general overview of basic principles of communication systems, whereby the possibility of the use of a time division multiplexing technique is mentioned.

SUMMARY

An object of the present invention is to provide a method for data and signal transfer between different sub-units of a medically-related system that enables expansion for later developments on the system without great expenditure and that additionally significantly reduces the number of necessary connections.

This object is achieved in accordance with the invention by a method and system for data and signal transfer between different sub-units of a medically-related system, wherein digitized analog and/or logical signals and digital data are mutually transmitted on a transfer line by means of serial multiplexing. The digitized analog and/or logical signals and the digital data are transmitted combined into individual packets that respectively contain both bits of the digitized signals and bits of the digital data, and that have a length that is small enough, in terms of the total number of bits per packet, so that adherence to a predetermined updating rate of the logic signals is achieved.

With this solution it is possible to transfer all signals (in particular control signals) to be exchanged between the individual sub-units and data over a single transmission line—if necessary with a separate return line for the opposite communication, which, however, also can be carried on the same transmission line. In principle all further connection lines can be avoided (with the exception of a line for the electrical voltage supply) via the bidirectional transfer both of the analog and/or logical signals in digitized form and of the digital data by means of the serial multiplexing over one or two transfer lines with high speed. This reduces the problem of the electromagnetic compatibility in electrical signal lines and improves the reliability of the transfer due to the lower number of components that are necessary for each interface. Due to the reduction of the number of physical components as well as connections for each interface to a minimum, the production, the testing as well as the servicing of the system are also simplified. If all analog and logic signals to be transferred in the system are transferred with the present method, a galvanic insulation between the individual sub-units on the signal plane is also achieved due to the necessary digitization of these signals. A particular advantage of the present method is the easy expansion capability of a system that is achieved by the method, since further signals or data can be implemented in the packets to be transferred without any further steps or modifications.

In a preferred embodiment of the present method as well as the associated system, the data transmission and control devices of each sub-unit necessary for the transfer are implemented in a programmable logical unit, preferably an FPGA (field programmable gate array) that can be changed via a software update of the program storage, or adapted to new requirements at any time. New functions can be added to the system in this manner, because the new digitized signals or data can be exchanged between the individual sub-units without having to install additional hardware or exchange hardware. This can also be implemented in a simple manner after the delivery of a system to the customer.

The method furthermore enables a simpler design of the respective systems and reduces their weight by avoiding of a substantial amount of wiring copper and other electrical connection elements. This advantage in particular plays an important role in CT systems in which the weight of the data and signal transfer devices on the rotating gantry can be significantly reduced by use of the method.

The additional transfer, on the same transmission line as the digital data, of signals that were previously transferred in an analog manner is enabled in the present method by the packet-by-packet transmission with a short packet length that enables the adherence to a predetermined updating rate of the signals necessary for the orderly functioning of the system. Packet lengths are preferably used that, given the transfer speed employed, enable an updating of the signals at time intervals in the range of 0.25 µs or lower. The transfer speed is preferably chosen at approximately 1 Gbps (gigabits per second) or higher. Such transfer rates can be realized without difficulty with commercially-available standard SERDES components (SERDES: Serializer and Deserializer) with which the data can be transferred, for example, by means of 8B/10B modulation. The use of such standard components for each interface of the sub-units of the system enables service personnel to use the same testing tools for all interfaces of the system.

Each individual data packet preferably is provided with an error detection code, for example a Reed-Solomon code, in order to be able to effect an error correction at the receiver side. The use of optical transmission lines solves the problem of the galvanic insulation and in particular also enables long transmission paths between the individual sub-units without problems. The problem of radiation emission of radio-frequency radiation, which occurs with conventional electrical transmission lines, is completely avoided via optical transmission lines.

In another embodiment of the method, a number of successive packets are combined into a frame, with respective, successive packets of a frame representing a different transmission channel in the corresponding block with the digital data. For example, given a combination of five packets into one frame, five different channels that can be associated with different functions of the system can be transferred with the frame.

The inventive medically-related system is formed of individual sub-units, data transmission devices and control devices that execute the inventive method for the transfer of incoming signals and digital data.

DESCRIPTION OF THE DRAWINGS

FIG. 1 illustrates an example of main connections between individual sub-units of the rotating part of a conventional CT system.

FIG. 2 illustrates an example of main connections within the stationary part of a conventional CT system.

FIG. 5 shows a first example for the transfer system of the present invention.

FIG. 6 shows a second example for the transfer system of the present invention.

FIG. 7 shows a third example for the transfer system of the present invention.

FIG. 8 shows a fourth example for the transfer system of the present invention.

DESCRIPTION OF THE PREFERRED EMBODIMENTS

Figure 3:
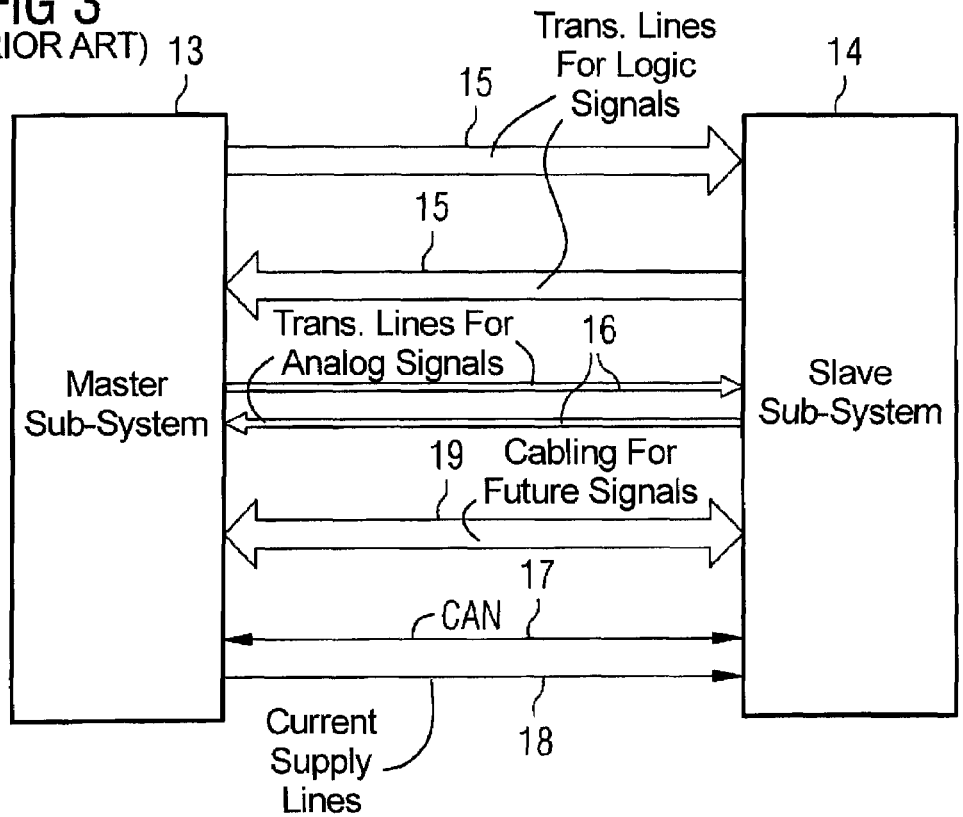
FIG. 3 illustrates an example for different transfer lines in a conventional CT system.

The present method is subsequently described in detail using a CT system that is visible in schematic representation in FIGS. 1 and 2.

FIG. 1 shows the gantry 2 of a CT system 1 with a rotating part 3 as well as a stationary part 4. An x-ray tube unit 6 as well as a data acquisition device 5 opposite thereto are visible within the rotating part 3. The x-ray tube unit 6 includes an x-ray tube, a collimator, a focus control device as well as a device for anode rotation. The data acquisition device 5 includes the x-ray detector as well as the associated evaluation unit. Furthermore, a master controller 7 for the rotating part 3 and for dose modulation, a voltage supply 9 with a radio-frequency generator and a voltage source for the rotation are disposed on the rotating part 3 of the gantry 2. The individual control signals and/or data are transferred from the master controller 7 to the respective sub-units and are received by these sub-units, as this is indicated by the arrows in FIG. 1. The master controller 7 on the rotating part 3 is connected with a master controller 8 on the stationary part 4 of the gantry 2. The signal and data transfer between both master controllers 3 and 4 can ensue, for example, via a corresponding slip ring pair that is attached to the rotating parts and the stationary part 4.

FIG. 2 shows the gantry 2 of the CT system 1, this time with a displaceable patient table 10, an image reconstruction system 12 as well as a unit 11 for voltage distribution. Here the stationary master controller 8 is also connected with the corresponding sub-units via connection lines via which control signals as well as digital data are transferred or exchanged, as is illustrated with the arrows. The individual arrows normally represent a number of electrical lines, for example analog signal lines for the control of the individual sub-systems as well as a CAN network connection for the transfer of the digital measurement data.

The number of connection lines used in current CT systems between two sub-systems (designated in the following as a master sub-system 13 that represents the master controller 7 or 8, and a slave sub-system 14) can be seen from FIG. 3. N or M differential, optically insulated logical signals (such as, for example, enable_xray, xxx_error or xray_on, dose_ok, xxx-_error, etc.) are transferred via the transmission lines 15. The transmission lines 16 represent electrical lines for the transfer of K differential analog signals in one direction or L differential analog signals in the other direction. Furthermore, a CAN connection 17 is normally provided for the direct transmission of digital data. In addition to the number of supply lines 18 for the different voltages (of, for example, 230 $V_{AC}$, 5 $V_{DC}$, -5 $V_{DC}$, 24 $V_{DC}$ etc.), additional cabling is necessary to allow for a later implementation of further signals in the event of upgrading of the CT system, as indicated with reference character 19.

Figure 4:
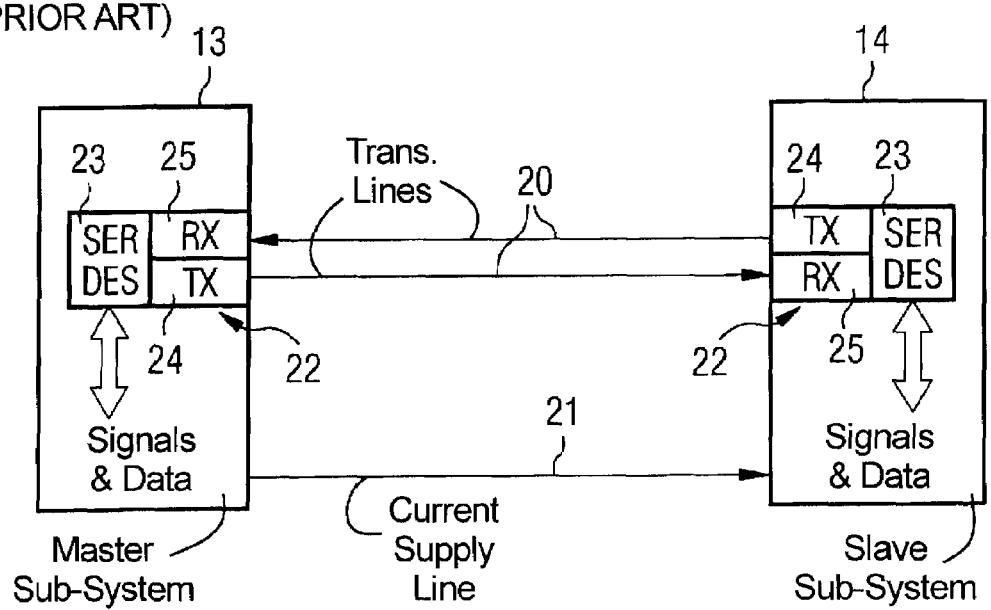
FIG. 4 illustrates an example for the transfer between two sub-systems (sub-units) of a CT system according to the present invention.

This number of connection lines, with the different connection protocols that occur in a CT system not only between the master controller 7 or 8 and one of the sub-systems, but also between individual sub-systems, requires a number of transfer components and additionally causes expansion of the CT system to be implemented only in a very complicated manner. In contrast, given the use of the present method, the number of connection lines is drastically reduced, as is schematically shown in FIG. 4. In the realization of this method, only one or two transmission lines 20 as well as a single supply line 21 for 230 $V_{AC}$ or 24 $V_{DC}$ are necessary between the master sub-system 13 and the slave sub-system 14. The data transmission and control devices 22 respectively necessary at the sides of these sub-systems are formed in this example of known SERDES components 23 with the associated transmitters 24 and receivers 25. The SERDES components 23 send the signals and data to be transferred in the form provided by the method, or forward the received signals and data to the corresponding components of the respective sub-unit.

In the present example, the transfer ensues with a speed of 1.25 Gbps in both directions in small data packets. The transfer ensues with the known 8B/10B modulation that is used in many other known transfer protocols such as, for example, 100 Mbps Ethernet, Gigabit Ethernet, Infiniband, etc. The 8B/10B modulation embeds the data and the clock signal in a direct-voltage-free bit stream that enables the synchronization with the clock by the receiver, a reliable decoding of the individual bits as well as a detection of the byte limits.

The format of the data packets is freely selectable in the present method and is adapted to the respective requirements. By implementation of the data transmission and control devices in each of the participating sub-units in an FPGA, updates and changes of the data format used can, like the transfer protocol used, be effected at any time.

An example for a possible data format is shown in the following. The format of the data packets is selected the same in both transfer directions. A data packet contains both the multiplexed, digitized signals and digital data values that can be freely determined, for example in byte form, as 16 bit words or as 32-bit words. Each data packet is self-synchronizing via a preceding control code (comma—K28.5), bearing an identification as well as a 1-byte CRC code for error detection. The structure of such a data packet is shown in the following table:

| Byte | MASTER → SLAVE | SLAVE → MASTER |
|---|---|---|
| 0 | Idle | Idle |
| 1 | Idle or Start | Idle or Start |
| 2 | Type/Sub-type | Type/Sub-type |
| 3 | Signals 7-0 | Signals 7-0 |
| 4 | Signals 15-8 | Signals 15-8 |
| 5 | Signals 23-16 | Signals 23-16 |
| 6 | Signals 31-25 | Signals 31-25 |
| 7 | Signals 39-33 | Signals 39-33 |
| 8 | Data 7-0 | Data 7-0 |
| 9 | Data 15-8 | Data 15-8 |
| 10 | Data 23-16 | Data 23-16 |
| 11 | Data 31-25 | Data 31-25 |
| 12 | CRC | CRC |

A data packet thus contains 12 bytes with an additional idle byte, also called sync or comma, between the individual packets in order to enable an automatic byte-synchronization at the receiver. The byte rate is hereby 125 Mbyte/s given 1.25 Gbps. The packet rate in the transfer is thus 1 packet every 104 ns or 9.6 Mpackets/s.

Each packet carries multiplexed, digitized signals as well as digital data. By digitized signals what are hereby primarily to be understood are signals previously transferred via separate lines, in particular analog signals that can change relatively quickly and thus require a high updating rate. In the present example, each of these signals is updated every 104 ns with a latency time of approximately 77 to 150 bit periods. The maximum delay in the updating of these signals is therefore 224 ns (150×0.8 ns=120 ns; 120 ns+104 ns=224 ns). This is sufficient for the control signals required in a CT system.

In the present example, a 32-bit block with digital data is moved between the respective sub-units with each packet every 104 ns. This block with digital data can be additionally multiplexed, dependent on the transfer format, in order to obtain a number of virtual transmission channels for digital data or also for digitized analog signals. An example for such a multi-channel transmission is explained in detail in the following.

In this example, respectively eight successive packets are combined into a frame. Each packet represents a time slot of the data transmission in which a different channel is transmitted. For this, the digital data of the respective block in each of the eight data packets represent the data of a different channel, such that the data of each channel are updated again after the transmission of respectively eight data packets, one frame. Should a faster updating rate of a single channel be necessary, the corresponding channel naturally can also be transferred multiple times in the same frame, for example with each second data packet. The following table shows the structure of a multi-channel frame with eight time slots. The data of each channel are thereby updated every 0.84 µs, such that a net transfer rate of 32 bit/µs in this regard for each channel.

| Time slot (packet type) | Data payload MASTER → SLAVE | Data payload SLAVE → MASTER |
|---|---|---|
| 0 | Channel 1 | Channel 1 |
| 1 | Channel 2 | Channel 2 |
| 2 | Channel 3 | Channel 3 |
| 3 | Channel 4 | Channel 4 |
| 4 | Channel 5 | Channel 5 |
| 5 | Channel 6 | Channel 6 |
| 6 | Channel 7 | Channel 7 |
| 7 | Protocol channel* | Protocol channel* |

*protocol = storage access, CAN telegram, TCP/IP frames, . . .

In the case of a CT system, the individual channels can, for example, be occupied, for example, with the transmission of the following data and signals:

an x-ray channel for the transfer of the high-voltage value, the dose value, etc.;

a patient monitoring channel for the transfer of the EKG signals, the pulse as well as respiration data;

a gantry channel for the transfer of table positions, the gantry inclination and the rotation speed, etc.;

a virtual logical analyzer and debug channel (multiplexed information);

a control information channel, i.e. the entire CAN protocol;

a channel for the transfer of the real-time clock of the CT system;

a storage channel for the read or, respectively, write access to 65536×16-bit virtual register;

a channel for the transfer of error detection codes for correction of transmission errors.

The introduction of a storage channel enables the access to a virtual 16-bit address×16-bit data space. Based on three packet identifiers and a data exchange based on the handshake principle, the associated protocol can enable the necessary read and write procedures in the 65536×16-bit virtual register. An example for the access is illustrated in both of the following tables, which show the read sequence as well as the write sequence.

Read Sequence:

| Direction | Packet sub-type | Data (low & high 16-bit words) |
|---|---|---|
| Server → Client | READ_REQ | Register address + additional info |
| Server ← Client | ACK | Mirror address + register data |

Write Sequence:

| Direction | Packet sub-type | Data (low & high 16-bit words) |
|---|---|---|
| Server → Client | WRITE-REQ | Register address + register data |
| Server ← Client | ACK | Mirror address or error code (OK, bad request, ...) |

A write access requires between two and three time slots, such that the storage access can ensue within approximately 2 to 2.5 µs. dependent on the phase shift between the time slots in both connection directions. This access is on average significantly faster than an access via a CAN, which requires approximately 0.5 to 1 ms for the execution of a fast command.

The communication previously conducted via a CAN network can also ensue via one of the virtual channels in the same manner as the provision of a storage channel. The speed in a data connection (which ensues in the present case with 1.25 Gbps (32 bits every µs)) enables the implementation of the CAN information (32 bits in 33 ms given a CAN 250 kHz) in a virtual channel, such that the separate, parallel CAN connection between master and slave can be dispensed with. In the present configuration, the CAN information is therewith transferred approximately 33000 times faster than in a CAN transmission line specially provided for this, as they are presently used.

The CAN information can naturally also be transferred together with the block of digitized signals transmitted with each packet, such that a still faster transfer results. In such an embodiment, further bus systems such as, for example, JTAG, TCP/IP can also be transmitted over the present connection.

The data transmission and control data serves for the implementation of the transfer protocol as well as for the transmission and reception as well as the distribution of the signals and digital data. In the preferred embodiment, the data transmission and control device is implemented in a programmable FPGA in order to enable an easy reconfiguration or changes in the transfer protocol. Different procedures are possible for the reconfiguration.

In the event that a parallel, independent CAN connected is present in the system between the master and the slave sub-systems, the updating of the FPGA configuration ensues via CAN. The master transmits the new FPGA configuration to the slave microcontroller by means of CAN. The new configuration is saved in a local, non-volatile storage. With each power-up sequence, the microcontroller loads each FPGA with the respective last valid configuration.

In the event that no independent CAN connection is available, for example because the transfer of the CAN information ensues over the existing connection, the updating of the FPGA configuration can ensue via special signals on the existing connection. However, this normally requires a simultaneously updating of the respective sub-units participating in the connection.

An advantageous possibility for the implementation of such an updating of the configuration is to provide in the implementation of the system a basic FPGA configuration that at least supports the updating protocol. The updating protocol is independent of the packet format and is not changed during the entire lifespan of the system. In the updating process, the slave sub-system is then placed in the configuration mode in which a predefined sequence of control codes is transferred over the connection by the master. The slave sub-system confirms the change into the configuration mode by sending back a defined sequence of control codes. Given the updating it is ensured that the configuration protocol is also adhered to by all future FPGA configurations.

After the change of the slave sub-system into the configuration mode, instead of the conventional packets the master sends only configuration data. After checking the integrity of the configuration data, for example via a checksum, CRC, etc., the slave subsystem saves the new configuration in a flash memory or in local configuration PROMs. After the subsequent deactivation and activation or a reset sequence, the new configuration is initialized on both sides of the connection.

In the present example, for the fast connection an 8B/10B SERDES component with PLL is, used in order to achieve a synchronization to the transmission clock for reliable decoding of the serial bit stream. For the implementation of this SERDES component, a solution using an ASIC is advantageous since this, typically has an integrated analog PLL that is finely tuned for such applications. However, this solution entails a long latency time. Therefore an FPGA with integrated SERDES can alternatively be used that exhibits a shorter internal latency time.

Different possibilities result for the embodiment of the data transmission and control device as well as the embodiment of the transmission lines, of which four embodiments are illustrated in FIGS. 5 through 8, respectively.

FIG. 5 thus shows an embodiment in which one part of the data transmission and control device 22 is implemented in an FPGA 26 in each sub-unit and is connected with a SERDES 23 realized by an ASIC. The respective transmitters and receivers are fashioned as optical transmitters 24a and optical receivers 25a, whereby the transmission ensues via optical lines 20a. This, embodiment reduces electromagnetic interferences, enables the upgrade to data transmission rates 2.5 Gbps and above, and enables long line paths as well as a galvanic insulation. Overall such a system is very insensitive to interferences.

Due to the higher costs of optical transmitters and receivers, an embodiment with transmitters and receivers 24b/25b that receive and transmit over electrical lines is naturally also possible. The transmission ensues via twin axial or coaxial cable 20b. This embodiment can be realized more cost-effectively than the embodiment of FIG. 5 given otherwise identical components.

FIG. 7 shows an embodiment in which the transmission is realized over Gigabit Ethernet cables and adapters. In this embodiment, in which a part of the data transmission and control device is implemented in an FPGA 26 (as in the preceding embodiment), a Gigabit Ethernet PHY adapter 27 is used for the data transmission, whereby the transfer ensues over a single CAT5 cable 20c via known RJ45 interfaces. The galvanic insulation ensues in a known manner via the magnetic components 28. This embodiment can be realized very cost-effectively due to the use of widely available, standard components.

In the connection between a few CT sub-units, it may be necessary to use more than one fast connection according to the present invention for the transmission. In such a case, the data transmission and control device (22) or a part of this is likewise realized via implementation in an FPGA (26) that has a number of SERDES building blocks with a plurality of transmitters/receivers (24/25), as this is illustrated in FIG. 8. The embodiment of the transmitter or, respectively, receiver as well as of the connection line can thereby ensue in a known manner, for example as explained in the preceding exemplary embodiments. For example, components of the Altera Stratix GX family, Xilinx Virtex-II Pro with 24 I/O transceivers, or Lattice ORCA 82G5 with eight transceivers are suitable components. For example, the BCM5402 (dual port) or BMC5421 (quad port) by Broadcom can be used for the fast connection via Gigabit Ethernet cable.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for data and signal transfer between sub-units of a medically-related system, comprising the steps of:
    serially multiplexing digital measurement data, and digitized control signals selected from the group consisting of analog control signals and logic control signals, to obtain serially multiplexed digitized signals and digital measurement data;
    updating said digitized control signals at a predetermined updating rate;
    combining the serially multiplexed digitized control signals and digital measurement data into respective packets each containing bits of the digitized control signals and bits of the digital measurement data, and each packet having a length in terms of bits per packet that is sufficiently small to adhere to said predetermined updating rate of said digitized control signals; and
    transmitting said serially multiplexed digitized control signals and digital measurement data in said packets via a single transmission line between respective sub-units of a medically-related system.

2. A method as claimed in claim 1 comprising transmitting said packets via said transmission line at a speed enabling said updating of said digitized signals in time intervals in a range of 0.25 μs or less.

3. A method as claimed in claim 1 comprising transmitting said packets via said transmission line at a speed of at least 1 Gbps.

4. A method as claimed in claim 1 comprising transmitting said packets via said transmission line using 8B/10B modulation.

5. A method as claimed in claim 1 comprising coding error detection data into each of said packets, and transmitting said error detection data in each packet via said transmission line.

6. A method as claimed in claim 1 comprising formulating each packet to comprise a synchronization code, a block containing said digitized signals, a block containing said digital data, and an error detection code.

7. A method as claimed in claim 6 comprising combining a plurality of said packets into a frame, with the respective blocks containing digital data of the respective packets in a frame representing different transmission channels.

8. A method as claimed in claim 7 comprising employing one of said transmission channels for access to a virtual storage.

9. A method as claimed in claim 7 comprising employing one of said transmission channels for transmission using higher protocols.

10. A method as claimed in claim 9 comprising selecting said higher protocols from the group consisting of CAN and TCP/IP.

11. A method as claimed in claim 1 comprising transmitting said packets bi-directionally between said sub-units via said single transmission line with a same transfer protocol in each direction.

12. A method as claimed in claim 1 comprising employing programmable logic units for controlling transmission and reception of said packets via said single transmission line between said sub-units.

13. A method as claimed in claim 12 comprising employing FPGAs as said programmable logic units.

14. A method as claimed in claim 13 comprising updating configuration of the respective sub-units between which said packets are to be transmitted by re-programming said programmable logic units.

15. A method as claimed in claim 1 comprising employing an optical transmission line as the single transmission line for transmitting said packets between said sub-units.

16. A method as claimed in claim 1 comprising employing standard SERDES components for transmitting said packets via said single transmission line between said sub-units.

17. A medically-related system, comprising:
    a serial multiplexer that serially multiplexes digital measurement data, and digitized control signals selected from the group consisting of analog control signals and logic control signals, to obtain serially multiplexed digitized control signals and digital measurement data, said digitized control signals being updated at a predetermined updating rate;
    a combination unit that combines the serially multiplexed digitized control signals and digital measurement data into respective packets each containing bits of the digitized control signals and bits of the digital measurement data, and each packet having a length in terms of bits per packet that is sufficiently small to adhere to said predetermined updating rate of said digitized control signals; and
    a single transmission line supplied with said serially multiplexed digitized control signals and digital measurement data in said packets connected between respective sub-units of a medically-related system, said single transmission line transmitting said packets between said sub-units.

18. A medically-related system as claimed in claim 17 wherein said plurality of sub-units form a computed-tomography system.

19. A medically-related system as claimed in claim 17 wherein each of said sub-units comprises an interface that supplies said packets into or receives said packets from said packets said transmission line, the respective interfaces being identical.

20. A medically-related system as claimed in claim 17 comprising programmable logic units that control transmission of said packets via said transmission line.

21. A medically-related system as claimed in claim 20 wherein said programmable logic units comprise FPGAs.

22. A medically-related system as claimed in claim 20 wherein said programmable logic units comprise standard SERDES components.

23. A medically-related system as claimed in claim 17 wherein said single transmission line is an optical transmission line.

* * * * *